United States Patent [19]

Rakover

[11] Patent Number: 4,862,999
[45] Date of Patent: Sep. 5, 1989

[54] DEVICE FOR BRAKING A BICYCLE

[75] Inventor: Jean-Jacques Rakover, Saint Quentin, France

[73] Assignee: Societe dite MBK Industries Societe Nouvelle MOTOBECANE S.A., Saint Quentin, France

[21] Appl. No.: 159,492

[22] Filed: Feb. 11, 1988

[30] Foreign Application Priority Data

Feb. 11, 1987 [FR] France ............... 87 01711

[51] Int. Cl.$^4$ .............................................. B62L 3/06
[52] U.S. Cl. .............................. 188/24.18; 188/24.19; 188/265
[58] Field of Search ............... 188/24.11, 24.18, 24.19, 188/265

[56] References Cited

U.S. PATENT DOCUMENTS

| 3,186,516 | 6/1965 | Stump | 188/106 P |
|---|---|---|---|
| 3,546,960 | 12/1970 | Masuda | 74/489 |
| 3,567,250 | 3/1971 | Wolf | 280/289 |
| 4,289,309 | 9/1981 | Hoffmann | 188/24.18 X |
| 4,325,467 | 4/1982 | Kine | 188/24.19 X |
| 4,351,418 | 9/1982 | Woodring | 188/24.22 |
| 4,442,923 | 4/1984 | Watatsuki et al. | 188/24.19 X |

FOREIGN PATENT DOCUMENTS

| 557949 | 8/1923 | France | 188/24.18 |
| 24606 | of 1900 | United Kingdom | 188/24.18 |

Primary Examiner—George E. A. Halvosa
Attorney, Agent, or Firm—Browdy and Neimark

[57] ABSTRACT

A device for retarding a bicycle having a braking system, the device includes an additional braking device independent of the braking system of the bicycle. A brake is associated with the additional braking device and a traction lever is provided for controlling the additional braking device which is adapted to be locked in a cable traction position. Transmission control cable is connected between the traction lever and the brake for controlling the additional braking device, and a force limiting device is positioned between the lever the additional brake for adjusting the additional braking device.

6 Claims, 1 Drawing Sheet

U.S. Patent  Sep. 5, 1989  4,862,999
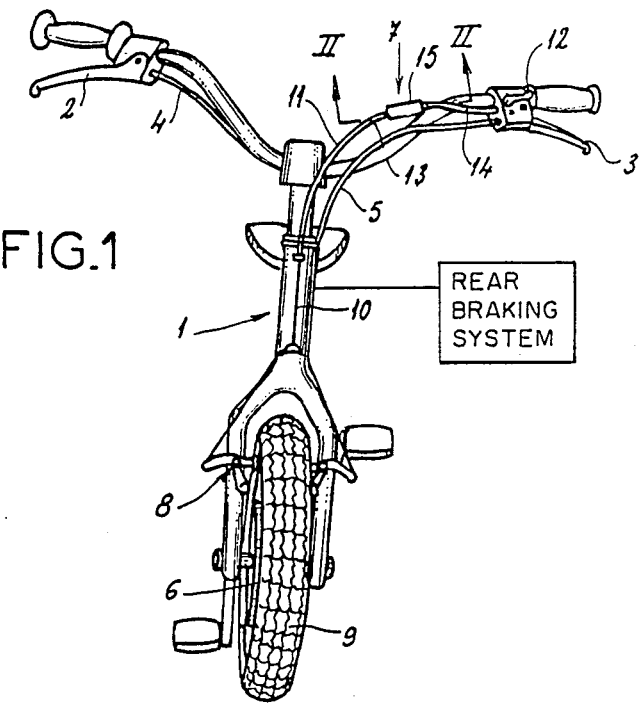
FIG.1
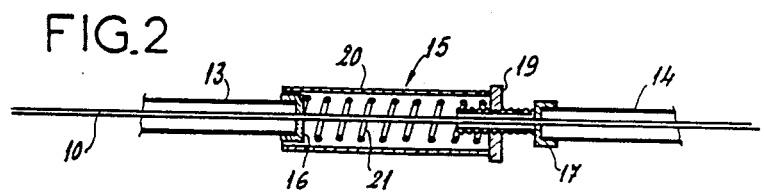
FIG.2
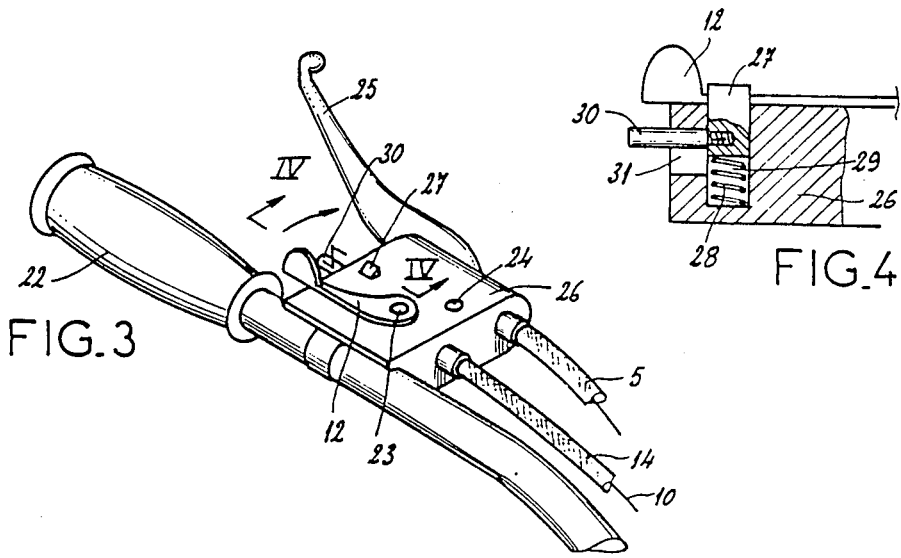
FIG.3
FIG.4

DEVICE FOR BRAKING A BICYCLE

BACKGROUND OF THE INVENTION

1. Field of The Invention

This invention relates to a device for retarding or braking a bicycle, in particular an all-terrain or descent bicycle.

2. The Prior Art

Braking of an all-terrain bicycle in the descending parts requires much dexterity and concentration on the part of the user. Thus, he cannot devote maximum attention to steering his vehicle.

SUMMARY OF THE INVENTION

This invention has as its object to facilitate steering of a bicycle, in particular an all-terrain or descent bicycle, by means of a retarding device installed on a bicycle and which the user simply has to engage when he desires to retard it. This device is made up of an additional braking device, independent of that of the bicycle, with standard traction by cable placed partially under sheath(s) and which forms a transmission control between a traction lever, lockable in cable traction position, and an additional brake, associated with this device. A force limiting device is inserted, on this transmission control, between the lever and this additional brake. This force limiting device is, for example, an elastic device consisting of an axial repulsion spring which is inserted on the transmission control, resting, for example, on a stationary point and a sheath stop, or between two sheath stops.

BRIEF DESCRIPTION OF THE DRAWINGS

In any case, the inventvion will be better understood, and its advantages and other characteristics will come out during the following description of a nonlimiting embodiment, with reference to the accompanying diagrammatic drawings in which:

FIG. 1 is a perspective front view of an all-terrain bicycle equipped with this device;

FIG. 2 is a detailed view, in section along II—II of FIG. 1, of the force limiting device;

FIG. 3 is a perspective view of the handlebar of the bicycle which comprises the lockable lever serving to operate this device; and FIG. 4 is a view, in section along IV—IV of FIG. 3, of the locking device of this lever.

DETAILED DESCRIPTION OF THE PREFERRED EMBODIMENT

FIG. 1 shows an all-terrain bicycle 1. This bicycle comprises both, in the front and in the back, a standard braking device with brake levers 2, 3, and cables under sheaths 4, 5 acting on two drum brakes, for example, drum 6 for the front wheel, which alone can be seen in the drawing.

To retard bicycle 1 during descent, without using normal braking device 2-6 of this vehicle, an additional or auxiliary braking device 7 is added, which is totally independent of this normal braking device 2-6. This retarder 7 comprises a braking device 8 with pads which act on the rim of front wheel 9, and with standard traction by cable 10 partially under sheath 11. Cable 10 and sheath 11 constitute the transmission control of this retarder, between its brake 8 and a traction lever 12 which can be locked in traction position, for which the retarder is actuated. Sheat 11 is interrupted towards the center thereof, and actually consists of two sheath portions 13, 14 between which is inserted a force limiting device 15.

Force limiter 15 is shown in detail in FIG. 2. The two portions of sheath 13, 14 end in two cup-shaped sheath stops 16, 17. Stop 17 comprises a threaded rod which is screwed into radial bottom plate 19 of a cylindrical body 20, coaxial with traction cable 10, and open at its end opposite the plate 19. Circular section of tube 20 is such that its inside diameter is very slightly greater than the outside diameter of the cup consituting the other stop 16, to allow easy and practically frictionless sliding of this cup 16 in tube 20. Cup 16 rests, on the side opposite the portion of sheath 13, on one of the ends of a repulsion helical spring 21. This spring is placed inside cylinder 20, coaxially with brake cable 10, and its other end rests on bottom plate 19. The elastic action of spring 21 on the two stops 16, 17 of sheath portions 13, 14 has the effect of automatically limiting the braking force.

The distance, at rest, i.e., when cable 10 is slack, between the brake pads and the rim of wheel 9, can be adjusted, in a way known in the art, by more or less screwing or unscrewing stop 17; thus, in particular, the wear of the brakes is compensated.

The device for engaging retarder 7, by means of lockable lever 12, is represented in FIGS. 3 and 4. Lever 12 is placed near grip 22 to be able to be operated with the thumb. It is pivoted around a pin 23, parallel to pivot pin 24 of lever 25 of the drum brake, and carried by the same support block 26. In the position represented in FIG. 3, lever 12 is at rest, and cable 10 is not taut.

By pushing lever 12 toward the front of the bicycle, i.e., by making it turn clockwise, as indicated by the arrow on FIG. 3, cable 10 is drawn and tightened so that the brake pads are brought into contact with and rub against the rim, the braking force being limited by force limiter 15. In its rotation movement, lever 12 drives home a locking bolt 27, which is mounted on a spring 28 in a cavity 29 of block 26 (FIG. 4). Cavity 29 is cylindrical and with an axis parallel to pivot pin 23. Bolt 27 exhibits, of course, a gentle ramp on the side turned towards grip 22, and a straight, abrupt ramp on the side turned toward brake lever 25. Bolt 27, after being lifted when lever 12 has continued its clockwsie movement, opposes the return of this lever into its rest position of FIG. 3.

Unlocking of lever 12, and therefore disengaging of retarder 7, is performed by downwardly pressing on a pin 30, solidly connected with bolt 27 and sliding in a lateral groove 31 of block 26; bolt 27is then retracted against the force of spring 28, which releases lever 12.

The invention, of course, is not limited to the embodiment which has just been described. Retarder 7 can be totally independent of the bicycle, and is fastened to its frame by a set of removable fasteners, such as collars. Force limited 15 can be installed at either end of the sheath; in this case, one of the ends of spring 21 rests on the sheath stop, while the other end rests on a stationary support point of the retarder. Spring 21 can be replaced by a block of rubber, elastomer, etc.

I claim:

1. A device for retarding a bicycle having a braking system, said device comprising:
   an additional braking device independent of the front and rear braking system of the bicycle;

an additional brake associated with said additional braking device;

a traction lever for controlling said additional braking device and adapted to be locked in a cable traction position.

transmission control means connected between said traction lever and said brake for controlling said additional braking device; and a force limiting device positioned between said lever and said additional brake for adjusting said additional braking device.

2. The device according to claim 1, wherein said transmission control means comprises a cable placed at least partially under at least one sheath for providing traction to said additional brake and wherein the cable traction position of said lever causes said cable to be pulled into a taut condition.

3. The device according to claim 2, wherein said force limiting device comprises an elastic axial repulsion element, coaxial with said traction cable and resting on at least a sheath stop.

4. The device according to claim 1, wherein said force limiting device is an elastic device.

5. A device according to claim 1, wherein said force limiting device further comprises a device for adjustment of said additional brake.

6. A device according to claim 1, wherein said additional braking device is totally independent of the bicycle and is fastened to the frame of the latter by removable fasteners.

* * * * *